(12) United States Patent
Payne

(10) Patent No.: US 11,863,561 B2
(45) Date of Patent: Jan. 2, 2024

(54) EDGE ATTESTATION FOR AUTHORIZATION OF A COMPUTING NODE IN A CLOUD INFRASTRUCTURE SYSTEM

(71) Applicant: Oracle International Corporation, Redwood Shores, CA (US)

(72) Inventor: Brian Spencer Payne, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 218 days.

(21) Appl. No.: 17/523,789

(22) Filed: Nov. 10, 2021

(65) Prior Publication Data

US 2023/0144341 A1     May 11, 2023

(51) Int. Cl.
*H04L 9/40* (2022.01)
*G06F 9/4401* (2018.01)

(52) U.S. Cl.
CPC .......... *H04L 63/102* (2013.01); *G06F 9/4416* (2013.01); *H04L 63/08* (2013.01); *H04L 63/20* (2013.01)

(58) Field of Classification Search
CPC ....... H04L 63/102; H04L 63/08; H04L 63/20; G06F 9/4416
USPC .......................................................... 713/2
See application file for complete search history.

(56) References Cited

U.S. PATENT DOCUMENTS

| | | | | |
|---|---|---|---|---|
| 4,677,588 A | * | 6/1987 | Benjamin | H04L 9/40 709/228 |
| 4,831,245 A | * | 5/1989 | Ogasawara | G06Q 20/341 235/492 |
| 6,263,446 B1 | * | 7/2001 | Kausik | G07F 7/1025 713/153 |
| 6,795,917 B1 | * | 9/2004 | Ylonen | H04L 9/40 726/13 |
| 6,823,454 B1 | * | 11/2004 | Hind | H04L 61/4511 713/168 |
| 7,340,508 B1 | * | 3/2008 | Kasi | G06Q 10/10 709/219 |

(Continued)

OTHER PUBLICATIONS

International Application No. PCT/US2022/077605, "International Search Report and the Written Opinion", dated Jan. 23, 2023, 14 pages.

*Primary Examiner* — Paul R. Myers
(74) *Attorney, Agent, or Firm* — Invoke

(57) ABSTRACT

The present embodiments relate to edge attestation of a host node to access a cloud infrastructure environment. A set of authentication data can be obtained from a console for authorization of the host node. The set of authentication data can include a first endorsement key and an authentication policy identifying characteristics of the host node. The host node can send a request for a network address to connect to the cloud infrastructure environment. The host node can generate a second endorsement key and authentication data that can be verified as corresponding to the set of authentication data received from the console. Responsive to validating the second endorsement key and the received host node authentication data, the network address can be provided to the host node that can be used to connect to the cloud infrastructure environment using the network address.

36 Claims, 10 Drawing Sheets

(56) References Cited

U.S. PATENT DOCUMENTS

| | | | | |
|---|---|---|---|---|
| 7,519,834 B1* | 4/2009 | Dondeti | ............... | H04L 9/0833 |
| | | | | 713/192 |
| 9,866,391 B1* | 1/2018 | Crites | ................. | H04L 63/108 |
| 11,533,316 B2* | 12/2022 | Smith | .................. | H04L 63/105 |
| 2002/0073335 A1* | 6/2002 | Shuster | ............... | H04L 63/083 |
| | | | | 726/7 |
| 2002/0083178 A1* | 6/2002 | Brothers | ............... | H04L 63/10 |
| | | | | 709/218 |
| 2002/0194483 A1* | 12/2002 | Wenocur | .............. | H04L 63/126 |
| | | | | 713/185 |
| 2003/0046529 A1* | 3/2003 | Loison | ................ | H04L 69/329 |
| | | | | 713/2 |
| 2003/0097553 A1* | 5/2003 | Frye, Jr. | ................. | H04L 61/50 |
| | | | | 713/2 |
| 2004/0039946 A1 | 2/2004 | Smith et al. | | |
| 2004/0053602 A1* | 3/2004 | Wurzburg | ............ | H04W 12/06 |
| | | | | 455/515 |
| 2005/0210249 A1* | 9/2005 | Lee | .................... | H04L 63/0428 |
| | | | | 713/168 |
| 2006/0107039 A1* | 5/2006 | Sugiura | ................ | G06F 21/608 |
| | | | | 713/175 |
| 2006/0212407 A1* | 9/2006 | Lyon | .................. | G06Q 20/4014 |
| | | | | 705/71 |
| 2007/0124578 A1* | 5/2007 | Paya | ....................... | H04L 51/00 |
| | | | | 713/168 |
| 2008/0010685 A1* | 1/2008 | Holtzman | ............. | G06F 21/805 |
| | | | | 726/28 |
| 2009/0204806 A1* | 8/2009 | Kanemura | ........... | G06F 21/445 |
| | | | | 713/155 |
| 2010/0077395 A1* | 3/2010 | Edwards | ................. | H04L 67/10 |
| | | | | 718/1 |
| 2011/0087550 A1* | 4/2011 | Fordyce, III | ......... | G06Q 20/384 |
| | | | | 705/14.66 |
| 2012/0072985 A1* | 3/2012 | Davne | .................... | H04L 67/10 |
| | | | | 709/225 |
| 2013/0097692 A1* | 4/2013 | Cooper | ................... | H04L 63/10 |
| | | | | 726/14 |
| 2014/0149601 A1* | 5/2014 | Carney | ............... | H04L 61/4511 |
| | | | | 709/238 |
| 2014/0208394 A1* | 7/2014 | Goodwin | ............. | H04L 9/3247 |
| | | | | 726/4 |
| 2020/0184078 A1 | 6/2020 | Hinrichs et al. | | |
| 2021/0334123 A1 | 10/2021 | Lent et al. | | |

* cited by examiner

EDGE ATTESTATION FOR AUTHORIZATION OF A COMPUTING NODE IN A CLOUD INFRASTRUCTURE SYSTEM

BACKGROUND

In a datacenter environment, a new component (e.g., a server) can be added as a new host device. The new components can be added to a cloud computing environment to increase computing resources in the cloud environment or provide additional functionality to applications/services executing on the components in the cloud environment. The new component can be physically connected to other devices in a datacenter environment connecting a plurality of devices implementing the cloud computing environment. For instance, a colocation center can provide a datacenter environment housing the components implementing a cloud computing environment.

However, in many instances, a datacenter environment (e.g., a colocation center) can house computing devices/datacenters for other entities. In such instances, another entity may have access to areas near the datacenter environment housing the components implementing the cloud computing environment. For example, another entity can maliciously connect a device to the datacenter environment without authorization. Without any verification process, the connected device can gain access to data and/or services privately maintained in the cloud computing environment.

SUMMARY

The present embodiments relate to edge attestation of a host node to access a cloud infrastructure environment. A first exemplary embodiment provides a method for attestation of a host node to access a cloud infrastructure environment. The method can include obtaining a set of authentication data from a console for authorization of a host node. The set of authentication data can include a first endorsement key and an authentication policy identifying characteristics of the host node. The authentication policy can include a first platform configuration register (PCR) value.

The method can also include obtaining, from the host node, a request for a network address to connect to a cloud infrastructure environment. The method can also include receiving a second endorsement key from the host node. The method can also include comparing the second endorsement key with the first endorsement key received in the set of authentication data to validate the second endorsement key.

The method can also include receiving a set of host node authentication data from the host node. The set of host node authentication data can include a second PCR value comprising hashed register values during a boot procedure of the host node. The method can also include comparing the received host node authentication data with the authentication policy received in the set of authentication data to validate the received host node authentication data by determining whether the first PCR value matches the second PCR value. The method can also include, responsive to validating the second endorsement key and the received host node authentication data, providing the network address to the host node. The host node can be configured to connect to the cloud infrastructure environment using the network address.

A second exemplary embodiment relates to a cloud infrastructure node. The cloud infrastructure node can include a processor and a non-transitory computer-readable medium. The non-transitory computer-readable medium can include instructions that, when executed by the processor, cause the processor to obtain a set of authentication data from a console for authorization of the host node. The set of authentication data can include a first endorsement key and an authentication policy identifying characteristics of the host node. The instructions can further cause the processor to obtain, from the host node, a request for a network address to connect to the cloud infrastructure environment.

The instructions can further cause the processor to transmit a request for a second endorsement key to the host node. The instructions can further cause the processor to receive the second endorsement key from the host node. The instructions can further cause the processor to compare the second endorsement key with the first endorsement key received in the set of authentication data to validate the second endorsement key. The instructions can further cause the processor to transmit a request for host node authentication data to the host node. The instructions can further cause the processor to receive the host node authentication data from the host node.

The instructions can further cause the processor to compare the received host node authentication data with the authentication policy received in the set of authentication data to validate the received host node authentication data. The instructions can further cause the processor to, responsive to validating the second endorsement key and the received host node authentication data, provide the network address to the host node. The host node can be configured to connect to the cloud infrastructure environment using the network address.

A third exemplary embodiment relates to a non-transitory computer-readable medium. The non-transitory computer-readable medium can include stored thereon a sequence of instructions which, when executed by a processor causes the processor to execute a process. The process can include obtaining a set of authentication data from a console for authorization of a host node. The set of authentication data can include a first endorsement key and an authentication policy identifying characteristics of the host node. The process can also include obtaining, from the host node, a request for a network address to connect to a cloud infrastructure environment.

The process can also include receiving a request for a pre-boot execution environment client from the host node. The process can also include providing a pre-boot execution environment client to the host node, wherein the host node is configured to execute a boot procedure using the pre-boot execution environment client.

The process can also include receiving a second endorsement key from the host node. The process can also include comparing the second endorsement key with the first endorsement key received in the set of authentication data to validate the second endorsement key. The process can also include receiving a set of host node authentication data from the host node derived during the boot procedure using the pre-boot execution environment client.

The process can also include comparing the received host node authentication data with the authentication policy received in the set of authentication data to validate the received host node authentication data. The process can also include, responsive to validating the second endorsement key and the received host node authentication data, providing the network address to the host node. The host node can be configured to connect to the cloud infrastructure environment using the network address.

DETAILED DESCRIPTION

Figure 1:
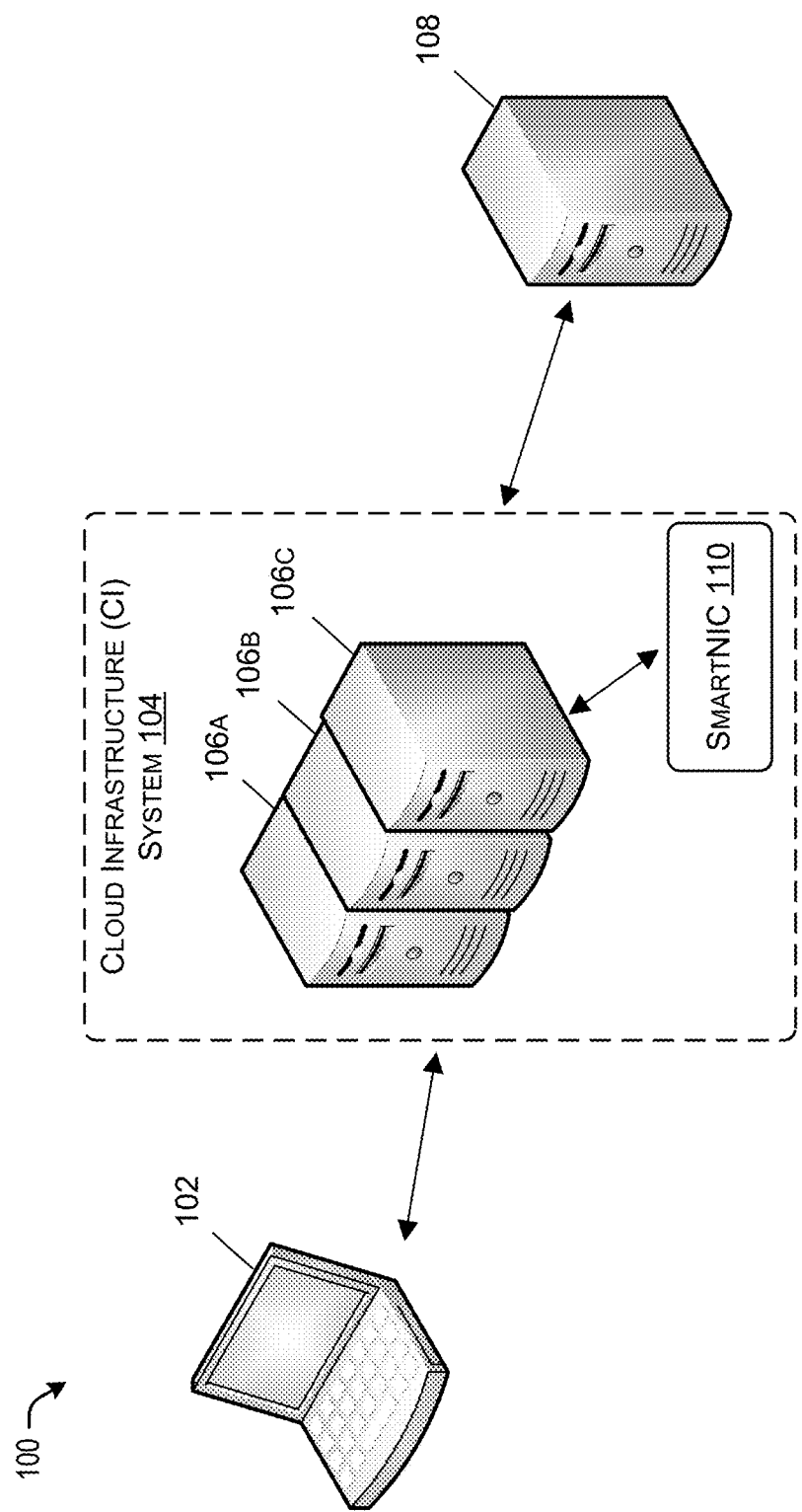
FIG. 1 is a block diagram of an example network environment, according to at least one embodiment.

In many instances, a plurality of computing devices (e.g., servers) and applications/services executing on the plurality of computing devices can implement a cloud computing infrastructure. Further, new host nodes can be added to the plurality of computing devices to increase computing resources or functionalities for the cloud infrastructure. In such instances, the new host nodes can be managed by verifying an identity and security features of the new computing devices. Such verification can be performed by remote attestation, which may include the computing devices providing cryptographically verifiable information to verify the identity and configuration of each computing device. The remote attestation procedure can be used to manage security of the devices in the network and identify a state of a computing device, for example.

Rather than implementing a centralized service to centrally implement remote attestation in the cloud infrastructure, a verification service can be performed by an edge node in the cloud infrastructure environment near host nodes. The attestation verification service can be included as part of a bump-in-the-wire node (e.g., a smart network interface controller (SmartNIC)) in the cloud infrastructure. Implementing an attestation verification service at a SmartNIC can offload processing tasks from central components of the cloud infrastructure, thereby increasing data processing efficiency of the cloud infrastructure. Further, in the event of a failure in the attestation verification service may only impact a small number of devices/applications with the attestation verification service being executed on the SmartNIC on the edge of the cloud infrastructure.

The present embodiments relate to an edge attestation service for authentication and authorization of host nodes in a network environment. Prior to a new host node being allowed access to the network, an authentication process can be performed. For example, a console can interact with an edge component (e.g., a SmartNIC) in the cloud infrastructure to obtain a set of authentication data (e.g., a public endorsement key, tenancy authentication data) for verification on the new host node.

In some instances, the SmartNIC can provide a pre-boot execution environment (e.g., iPXE) to the host node for the host node to execute a boot procedure without requiring an OS to be previously installed on the host node. For example, an iPXE client can be provided to the host node to allow for communication between the iPXE client executing on the host node and an iPXE environment executing on the SmartNIC.

The SmartNIC can transmit a request for an endorsement key to the host node and, in response, the host node can generate the endorsement key (e.g., based on a generated public/private key pair). The SmartNIC can obtain the endorsement key and compare it with the public endorsement key received in the set of authentication data and verify that the endorsement key obtained from the host node corresponds with (e.g., matches) the public endorsement key received in the set of authentication data. Verifying the received endorsement key can verify the identity of the host node.

The SmartNIC can transmit a request for authentication data to the host node. The authentication data can include data authenticating the host node, such as a firmware configuration, a device configuration, a platform configuration register (PCR) value, etc. The host node can generate the authentication data and can provide the generated authentication data to the SmartNIC. The received authentication data can be compared with the authentication policy received in the set of authentication data to validate the received authentication data (e.g., by matching a PCR value generated by the host node with a corresponding PCR value provided in the set of authentication data).

The SmartNIC can provide a network address to the host node responsive to validating the received endorsement key and the authentication data received from the host node. Providing the network address (e.g., internet protocol (IP) address) to the host node can allow the host node to access components/applications/services in the cloud infrastructure. This can allow for increased security in providing access to the cloud infrastructure.

A. System Overview

FIG. 1 is a block diagram of an example network environment 100. The network environment 100 can allow for data communication between devices in the environment using one or more networks (e.g., the Internet). As shown in FIG. 1, the network environment 100 can include any of a console 102, a cloud infrastructure (CI) system 104 (and corresponding computing devices 106a-c), and host node 108.

The console 102 can include a computing device (e.g., laptop computer) capable of communicating with the CI system 104. For instance, the console 102 can provide instructions to create an instance for the host node 108 (e.g., including the set of authentication data) to the CI system 104. As another example, the console 102 can instruct the host node 108 to fetch a pre-boot execution environment client (e.g., iPXE) from the CI system 104 or initiate a session between the host node 108 and SmartNIC 110.

The CI system 104 as described herein can include one or more interconnected computing devices implementing one or more cloud applications or services. For instance, the CI system 104 can store and provide access to database data (e.g., via a query of the database). The computing devices (e.g., 106a-c) included in the CI system 104 can be located in one or more datacenter environments (e.g., colocation centers).

As shown in FIG. 1, computing device 106c can implement a SmartNIC 110. The SmartNIC 110 can be located on an edge component (e.g., computing device 106c) in the CI system 104. For example, the SmartNIC 110 can reside on a server disposed in a datacenter acting as an edge access point to the CI system 104. The SmartNIC 110 can perform the remote attestation service as described herein.

The host node 108 can include a computing device (e.g., a server) or series of computing devices being introduced to the CI system 104. For instance, the host node can include a server that is connected to the CI system 104 at a datacenter environment (e.g., a colocation center) and is requesting to access the CI system 104. The host node 108 can be configured to perform various processing tasks or implement one or more applications/services. As described herein, the host node 108 can request a network address to access the CI system 104 and receive the network address responsive to the SmartNIC 110 validating endorsement keys and authentication data provided by the console 102 and host node 108, respectfully.

Figure 2:
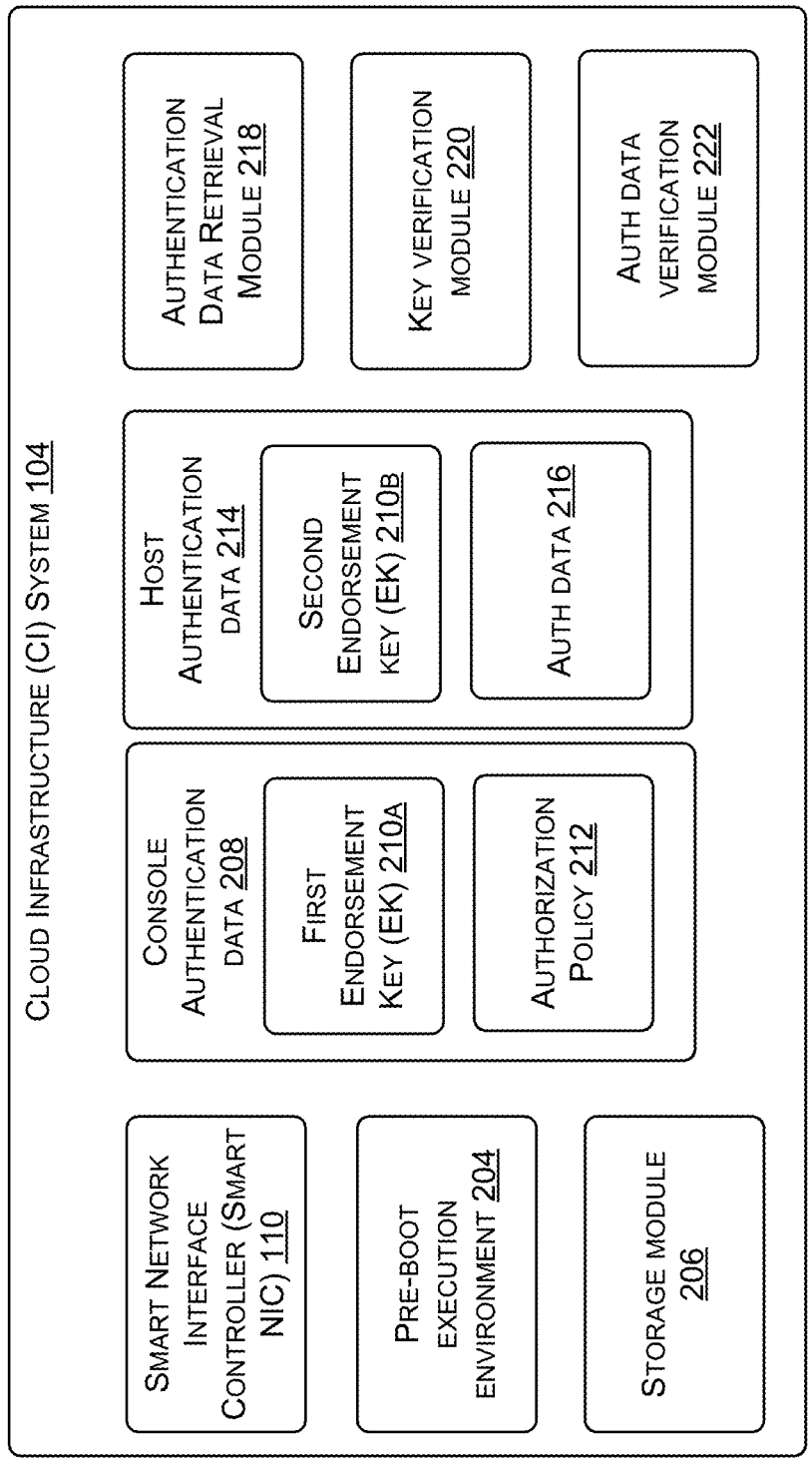
FIG. 2 is a block diagram of an example cloud infrastructure system, according to at least one embodiment.

FIG. 2 is a block diagram of an example cloud infrastructure system 104. As described above, the CI system 104 can include one or more interconnected computing devices implementing various applications/services. The CI system 104 can include one or more central computing devices implementing core functionality of the CI system 104 and an edge device maintaining the SmartNIC 110. The SmartNIC 110 can interact with the host node (e.g., 108) to obtain authentication data and validate the authentication data as described herein.

The CI system 104 can include a pre-boot execution environment 204. The pre-boot execution environment 204 can include an environment (e.g., iPXE) configured to provide a client to the host node allowing the host node to execute the pre-boot execution environment without an installed operating system (OS) on the host node. For instance, the host node can retrieve an iPXE client from the SmartNIC and execute the iPXE client by interacting with the pre-boot execution environment 204 executing in the CI system 104.

The CI system 104 can include a storage module 206. The storage module 206 can store various data types (e.g., mounted boot partitions for validated host nodes) across devices in the CI system 104.

The CI system 104 can include console authentication data 208. The console authentication data 208 can include data obtained in a set of authentication data from a console for edge attestation of a new host node. The console authentication data 208 can include a first endorsement key (EK) 210a and a tenancy authorization policy 212. In some instances, the console authentication data 208 can store obtained authentication data for a plurality of host nodes introduced to the CI system 104.

The first EK 210a can include a key (e.g., a trusted platform module (TPM) RSA key) provided by the console identifying the host node. The tenancy authorization policy 212 can include characteristics of the host node, such as a firmware version, a configuration setting, a PCR value, etc.

The CI system 104 can also include host authentication data 214. The host authentication data 214 can include information obtained from a host node, such as a second EK 210b and authentication data (or "auth data") 216. The data in the host authentication data 214 can be compared with console authentication data 208 for identification and validation of the host node as described herein.

The CI system 104 can include an authentication data retrieval module 218. The authentication data retrieval module 218 can obtain authentication data (e.g., console authentication data 208) and receive host authentication data (e.g., 214) from the host node as described herein. In some instances, the authentication data retrieval module 218 can request the host authentication data (e.g., 214) responsive to providing a pre-boot execution environment client to the host node and/or receiving a request for a network address from ten host node.

The CI system 104 can include a key verification module 220. The key verification module 220 can obtain a key from a host node and verify the key using the key provided by the console 102. Verifying the key can include determining whether the received key matches/corresponds to (e.g., includes a number of similarities to) the key provided by the console.

The CI system 104 can include an authentication (auth) data verification module 222. The auth data verification module 222 can obtain/identify auth data and compare the received auth data with an auth policy received from the console. For instance, auth data can specify a firmware version, a host node configuration, a PCR value (e.g., a hashed series of values added responsive to components identified/activated during a boot procedure), etc. In this example, the auth data can be compared with a tenancy auth policy to match values, firmware versions, data types specific to the host node, etc. Responsive to the key and the auth data being verified, the host node can be verified and allowed access to the cloud infrastructure (e.g., by providing the host node a network address).

B. Example Methods for Performing an Edge Attestation Procedure

Figure 3:
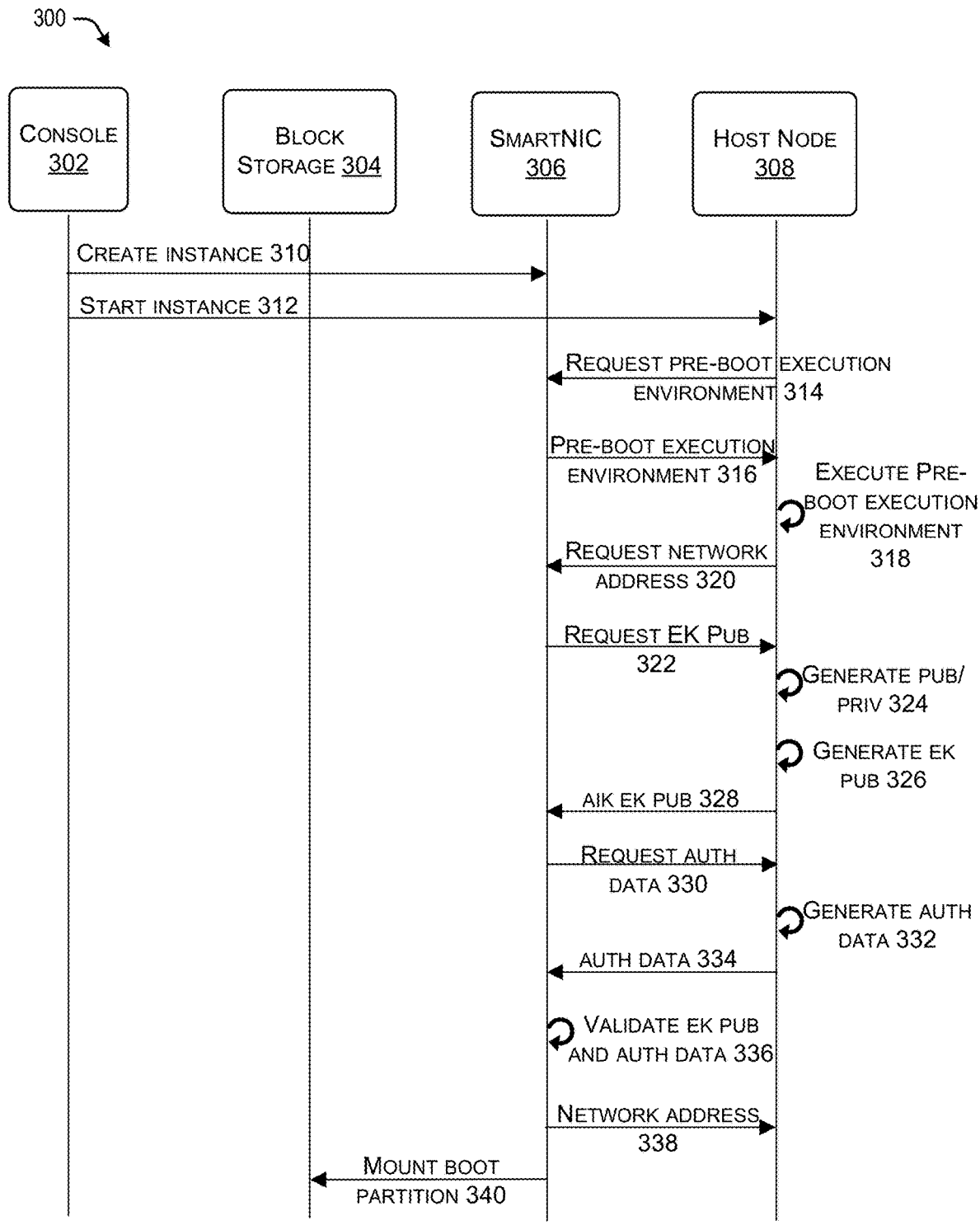
FIG. 3 is a signaling process illustrating an example edge attestation process, according to at least one embodiment.

FIG. 3 is a signaling process 300 illustrating an example edge attestation process. As shown in FIG. 3, a console 302 and a host node 308 can interact with a SmartNIC 306 (e.g., executed on an edge computing device in the CI system).

At 310, the console 302 can send a request to create a new host instance to the SmartNIC 306. The request to create a new host instance can identify the new host node and can include a first endorsement key and a tenancy auth policy for verification of the host node.

At 312, the console 302 can send a request to start the host node instance to the host node 308. The request received by the host node 308 can include instructions to connect to the SmartNIC 306 and initiate a boot procedure.

At 314, the host node 308 can send a request for a pre-boot execution environment (e.g., an iPXE client) to the SmartNIC 306. The request can include a request for the iPXE client from the SmartNIC 306. As described herein, the iPXE client can allow for a boot procedure to be performed by the host node 308 without an operating system being loaded on the host node 308.

At 316, The SmartNIC 306 can provide the pre-boot execution environment (e.g., the iPXE client) to the host node. At 318, the host node 308 can execute the pre-boot execution environment (e.g., by the iPXE client interacting with an iPXE instance associated with the SmartNIC 306 executing on an edge device. Executing the pre-boot execution environment can execute a boot procedure that includes running a boot procedure, initiating services/applications, and components, etc.

In some instances, during the boot procedure, a PCR value can be computed. The PCR value can include a hashed series of values indicating each initiated component/service by the host node 308. The PCR value can be indicative of a state of the host node 308 after the boot procedure.

At 320, host node 308 can request network address from the SmartNIC 306. The network address (e.g., an IP address) can allow for connection to the CI system. The SmartNIC 306 may only give the network address responsive to validating the host node as described herein.

At 322, the SmartNIC 306 can request a public endorsement key (EK) from the host node 308. At 324, the host node 308 can generate a public/private key pair. At 326, the host node 308 can generate the public endorsement key from the key pair. At 328, the host node 308 can send the public endorsement key to the SmartNIC 306. The public endorsement key can be compared with the key provided during the request to create the instance (e.g., at 310) provided by the console.

At 330, the SmartNIC 306 can request a set of auth data from the host node 308. At 332, the host node 308 can generate the requested set of auth data (e.g., details relating to the host node, a firmware version, a configuration setting, a PCR value) as specified in the request for the set of auth data. At 334, the host node 308 can send the set of auth data to the SmartNIC 306 for verification of the auth data.

At 336, the SmartNIC can validate the received public endorsement key and the set of auth data. This can include comparing the data received from the host node 308 with data obtained from the console 302 in the request to create the instance (e.g., at 310).

Responsive to validating the received data, at 338 the SmartNIC 306 can send a network address to the host node 308. The network address can allow for connection and data communication between the host node 308 and the CI system. At 340, the SmartNIC 306 can mount a boot partition specific to the host node at a block storage 304.

Figure 4:
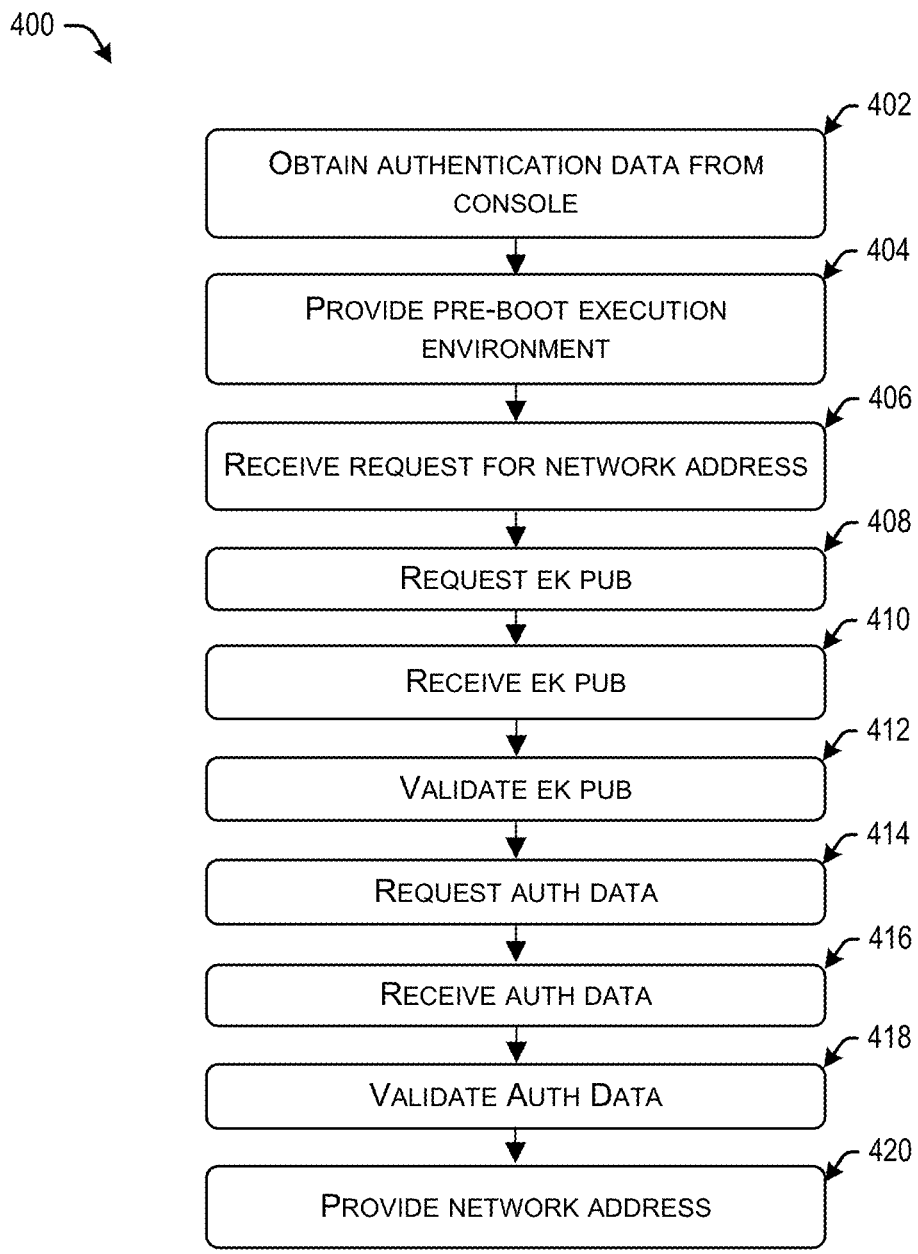
FIG. 4 is a block diagram illustrating an example method performed by a SmartNIC for performing an edge attestation process, according to at least one embodiment.

FIG. 4 is a block diagram 400 illustrating an example method performed by a SmartNIC for performing an edge attestation process. At 402, the SmartNIC can obtain a set of authentication data from a console for authorization of the host node. The set of authentication data can include a first endorsement key and an authentication policy identifying characteristics of the host node.

At 404, the SmartNIC provide a pre-boot execution environment (e.g., an iPXE client). The SmartNIC can receive a request for a pre-boot execution environment client from the host node. The SmartNIC can providing a pre-boot execution environment client to the host node. The host node can be configured to execute a boot procedure using the pre-boot execution environment client.

At 406, the SmartNIC can obtain, from the host node, a request for a network address to connect to the cloud infrastructure environment. In some instances, the request for the network address is obtained from the host node responsive to the host node connecting to a datacenter environment comprising one or more computing devices implementing the cloud infrastructure environment.

At 408, the SmartNIC can transmit a request for a second endorsement key to the host node. At 410, the SmartNIC can receive the second endorsement key from the host node. The second endorsement key can include a public attestation identity key (AIK).

At 412, the SmartNIC can compare the second endorsement key with the first endorsement key received in the set of authentication data to validate the second endorsement key. This can include determining that at least one value in the second endorsement key matches a corresponding value in the first endorsement key.

At 414, the SmartNIC can transmit a request for host node authentication data to the host node. At 416, the SmartNIC can receive the host node authentication data from the host node.

At 418, the SmartNIC can comparing the received host node authentication data with the authentication policy received in the set of authentication data to validate the received host node authentication data. This can include identifying a first platform configuration register (PCR) value included in the authentication policy and a second PCR value provided in the received host node authentication data (e.g., generated during a boot procedure). The second PCR value can include hashed register values during a boot procedure of the host node that indicates a state of the host node after the boot procedure. This can also include determining whether the first PCR value matches the second PCR value. The received host node authentication data can be validated responsive to determining that the first PCR value matches the second PCR value.

At 420, the SmartNIC can provide the network address to the host node. The host node can be configured to connect to the cloud infrastructure environment using the network address. This may be performed responsive to validating the second endorsement key and the received host node authentication data.

Figure 5:
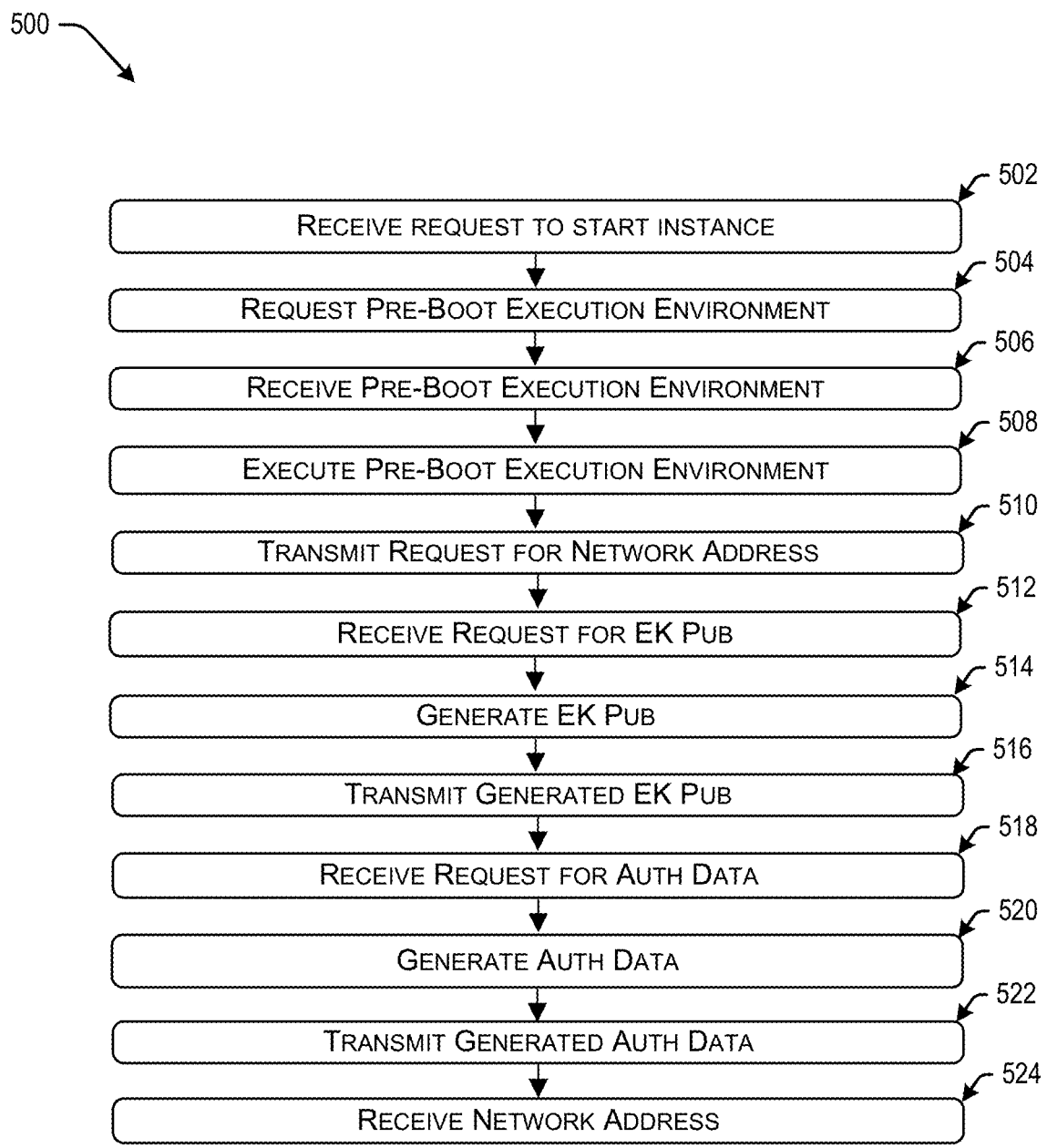
FIG. 5 is a block diagram illustrating an example method performed by a host node to be validated using an edge attestation process, according to at least one embodiment.

FIG. 5 is a block diagram 500 illustrating an example method performed by a host node to be validated using an edge attestation process. At 502, the host node can receive a request to start an instance from a console. The request to start the instance can include instructions to communicate with a SmartNIC and instructions to implement a boot procedure.

At 504, the host node can request a pre-boot execution environment from a SmartNIC. At 506, the host node can receive the pre-boot execution environment from the SmartNIC. At 508, the host node can execute the pre-boot execution environment. The pre-boot execution environment can include an iPXE client capable of performing a boot procedure without the use of an operating system on the host node by interacting with a iPXE instance at the SmartNIC.

At 510, the host node can transmit a request for a network address (e.g., IP address) from the SmartNIC. At 512, the host node can receive a request for a public endorsement key (EK pub) from the SmartNIC. At 514, the host node can generate the EK pub. The EK pub can be generated from a public/private key pair generated by the host node. At 516, the host node can transmit the generated EK pub to the SmartNIC. The SmartNIC can validate the received EK pub (e.g., or second endorsement key) by comparing the received EK pub with a key received by a console.

At 518, the host node can receive a request for auth data (e.g., host node authentication data). At 520, the host node can generate auth data (e.g., a second PCR value based on the boot procedure). At 522, the host node can transmit the generated auth data to the SmartNIC. The SmartNIC can validate the auth data by comparing the received auth data with an authentication policy.

At 524, the host node can receive a network address from the SmartNIC. The network address can allow for connection/data transmission to the cloud infrastructure using the network address. The network address can be received responsive to the SmartNIC validating the auth data.

C. IaaS Overview

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like. In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to be set up first. In some instances, the provisioning can be done manually, a provisioning tool may be utilized to provision the resources, and/or deployment tools may be utilized to deploy the code once the infrastructure is provisioned.

Figure 6:
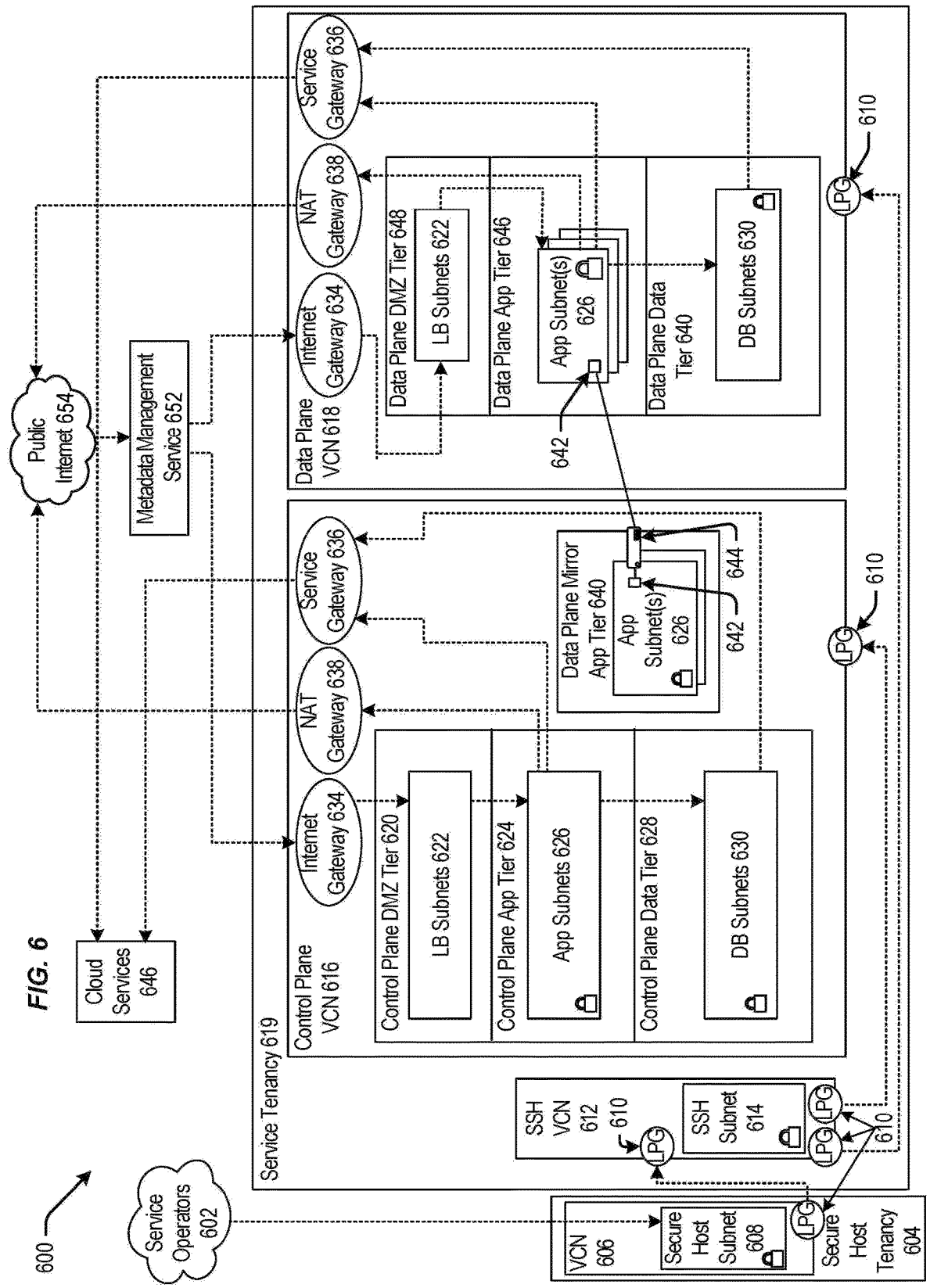
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of threat prevention, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
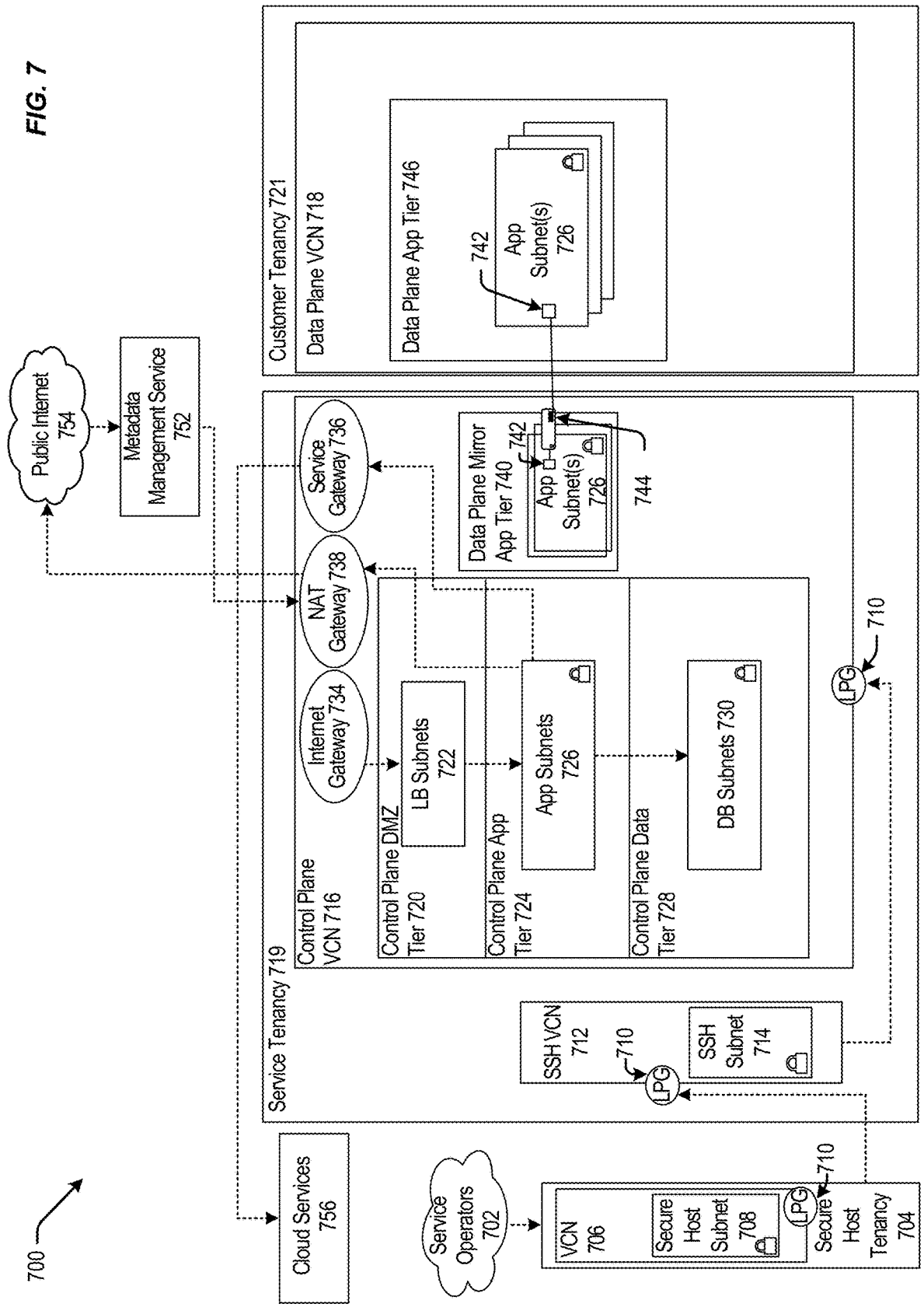
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
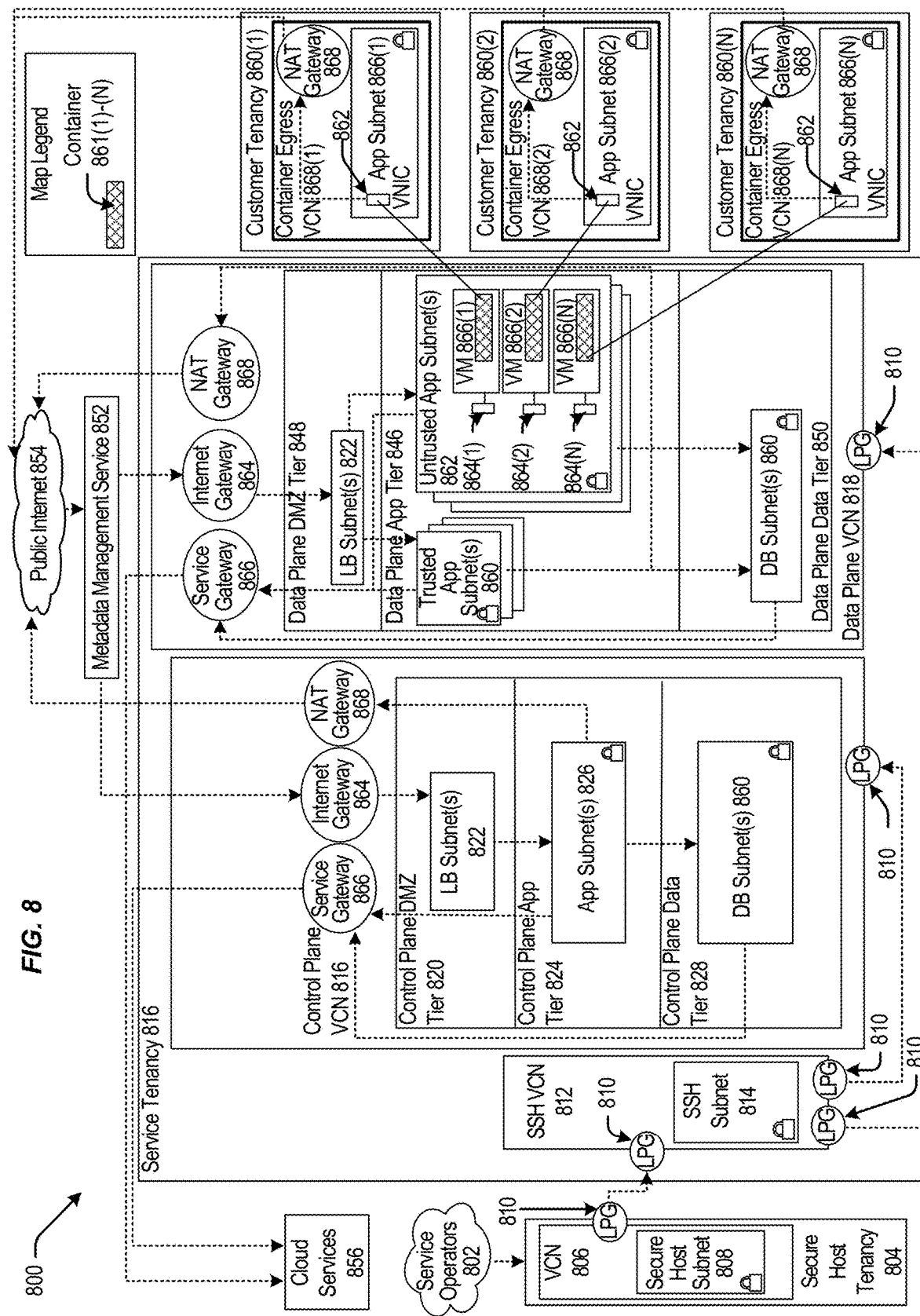
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
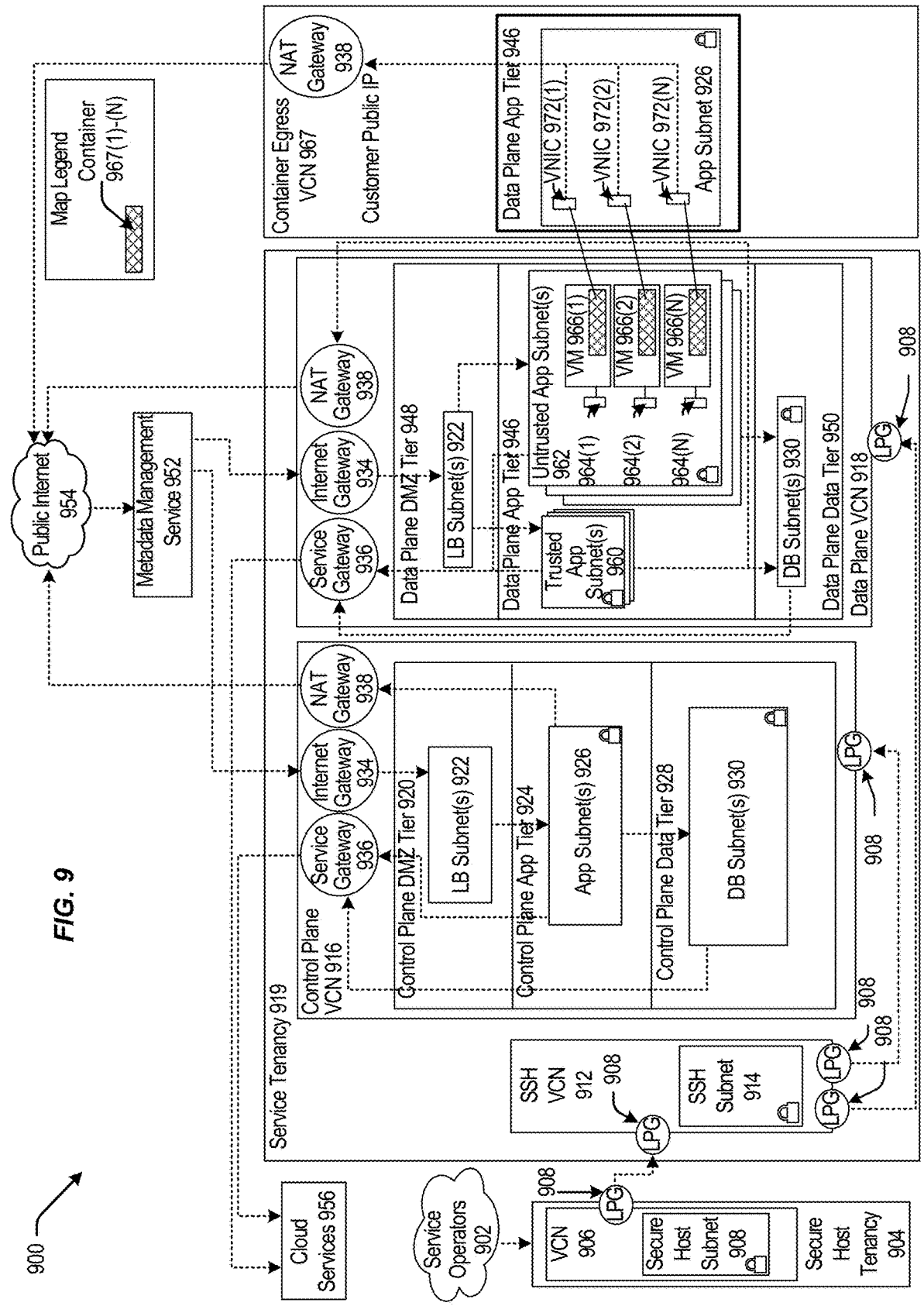
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
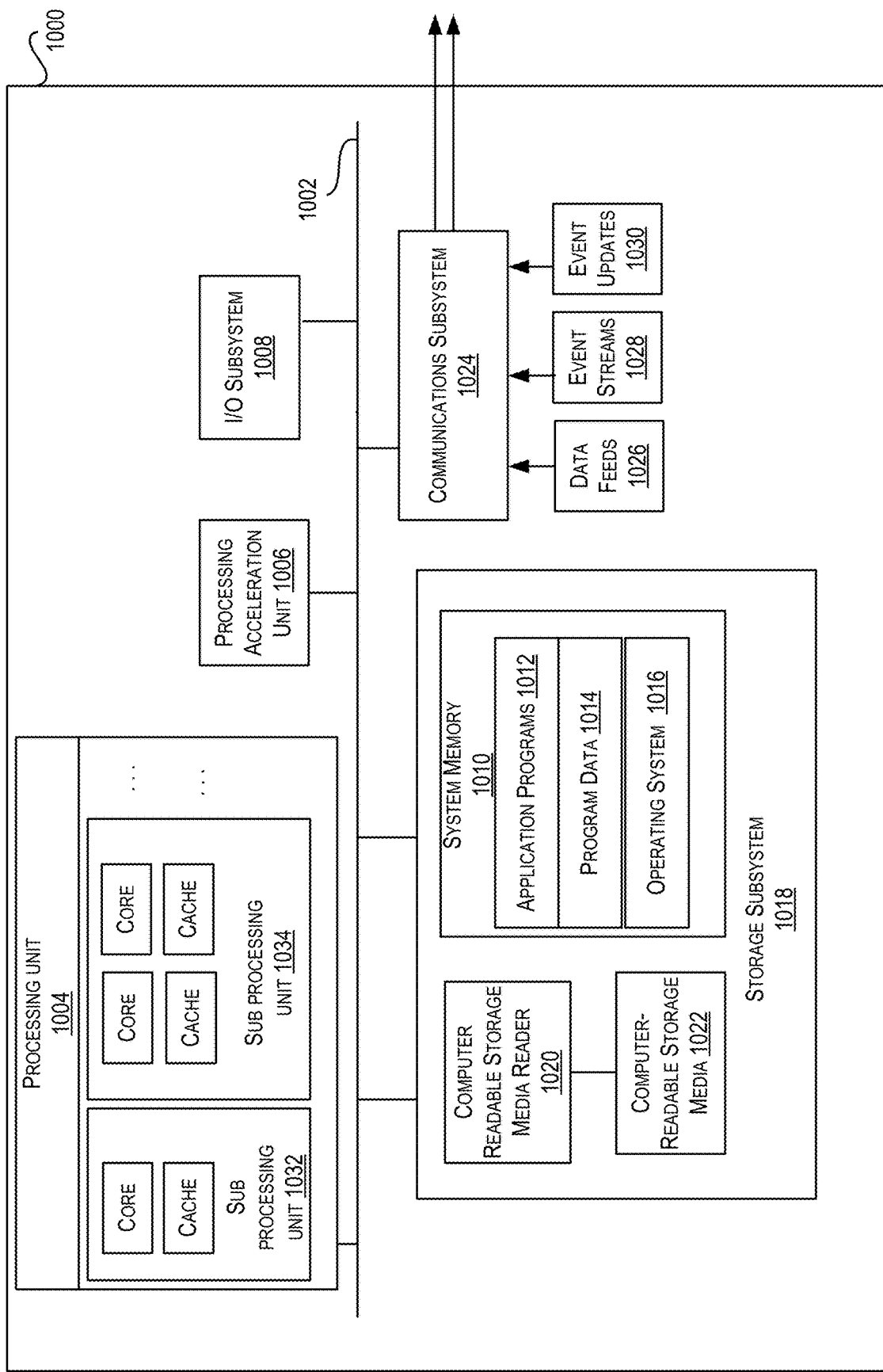
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

The invention claimed is:

1. A method, comprising:
  receiving, at an edge node of a cloud infrastructure environment, a first request from a console associated with the cloud infrastructure environment,
    wherein the first request comprises a first instruction to create a host instance for a host node,
    wherein the first request comprises a set of authentication data for an edge attestation process,
    wherein the set of authentication data comprises a first endorsement key and a first set of state data,
      wherein the first set of state data is indicative of a reference state of the host node;
  receiving, at the edge node, a second request from the host node,
    wherein the second request comprises a second instruction to connect the host node to the cloud infrastructure environment;
  performing the edge attestation process at least in part via the edge node, wherein the edge attestation process comprises:
    receiving, at the edge node, a second endorsement key from the host node;
    validating the second endorsement key at least by comparing the second endorsement key with the first endorsement key;
    receiving, at the edge node, a second set of state data, wherein the second set of state data is indicative of a state of the host node;
    validating the second set of state data at least by comparing the second set of state data with the first set of state data; and
  responsive to validating the second endorsement key and the second set of state data,
    transmitting, from the edge node to the host node, a network address corresponding to a resource of the cloud infrastructure environment, wherein the host node accesses the resource using the network address.

2. The method of claim 1, wherein the first endorsement key comprises a first public key component of a first public attestation identity key; or wherein the second endorsement key comprises a second public key component of a second public attestation identity key.

3. The method of claim 1, wherein the edge node is a component of a smart network interface controller.

4. The method of claim 1, wherein validating the second endorsement key at least by comparing the second endorsement key with the first endorsement key comprises:
determining that at least one value of the second endorsement key matches a corresponding value of the first endorsement key.

5. The method of claim 1, wherein the method further comprises:
prior to receiving the second request from the host node:
receiving a pre-boot request from the host node for a pre-boot execution environment client; and
transmitting the pre-boot execution environment client to the host node,
wherein the host node executes a boot procedure using the pre-boot execution environment client.

6. The method of claim 1, wherein the method further comprises:
mounting a boot partition to a storage module,
wherein the boot partition is specific to the host node, and wherein the network address corresponds to the boot partition.

7. The method of claim 1, wherein the second request comprises a request for the network address, wherein the second request is transmitted from the host node responsive to the host node connecting to a datacenter environment comprising one or more computing devices implementing the cloud infrastructure environment.

8. A system, comprising:
at least one hardware processor;
the system being configured to execute operations, using the at least one hardware processor, the operations comprising:
receiving, at an edge node of a cloud infrastructure environment, a first request from a console associated with the cloud infrastructure environment,
wherein the first request comprises a first instruction to create a host instance for a host node,
wherein the first request comprises a set of authentication data for an edge attestation process,
wherein the set of authentication data comprises a first endorsement key and a first set of state data,
wherein the first set of state data is indicative of a reference state of the host node;
receiving, at the edge node, a second request from the host node,
wherein the second request comprises a second instruction to connect the host node to the cloud infrastructure environment;
performing the edge attestation process at least in part via the edge node, wherein the edge attestation process comprises:
receiving, at the edge node, a second endorsement key from the host node;
validating the second endorsement key at least by comparing the second endorsement key with the first endorsement key;
receiving, at the edge node, a second set of state data,
wherein the second set of state data is indicative of a state of the host node;
validating the second set of state data at least by comparing the second set of state data with the first set of state data; and
responsive to validating the second endorsement key and the second set of state data,
transmitting, from the edge node to the host node, a network address corresponding to a resource of the cloud infrastructure environment,
wherein the host node accesses the resource using the network address.

9. The system of claim 8, wherein the second endorsement key comprises a public key component of a public attestation identity key.

10. The system of claim 8, wherein validating the second endorsement key at least by comparing the second endorsement key with the first endorsement key comprises:
determining that at least one value of the second endorsement key matches a corresponding value of the first endorsement key.

11. The system of claim 8, wherein the operations further comprise:
prior to receiving the second request from the host node:
receiving a pre-boot request from the host node for a pre-boot execution environment client; and
transmitting the pre-boot execution environment client to the host node,
wherein the host node executes a boot procedure using the pre-boot execution environment client.

12. The system of claim 8, wherein validating the second set of state data at least by comparing the second set of state data with the first set of state data comprises:
identifying a first platform configuration register value included in the first set of state data;
identifying a second platform configuration register value included in the first set of state data; and
determining that the first platform configuration register value matches the second platform configuration register value.

13. The system of claim 8, wherein the operations further comprise:
mounting a boot partition to a storage module,
wherein the boot partition is specific to the host node, and wherein the network address corresponds to the boot partition.

14. The system of claim 8, wherein the second request comprises a request for the network address, wherein the second request is transmitted from the host node responsive to the host node connecting to a datacenter environment comprising one or more computing devices implementing the cloud infrastructure environment.

15. One or more non-transitory computer-readable media comprising instructions, which when executed by one or more hardware processors, cause performance of operations comprising:
receiving, at an edge node of a cloud infrastructure environment, a first request from a console associated with the cloud infrastructure environment,
wherein the first request comprises a first instruction to create a host instance for a host node,
wherein the first request comprises a set of authentication data for an edge attestation process,
wherein the set of authentication data comprises a first endorsement key and a first set of state data,
wherein the first set of state data is indicative of a reference state of the host node;

receiving, at the edge node, a second request from the host node,
  wherein the second request comprises a second instruction to connect the host node to the cloud infrastructure environment;
performing the edge attestation process at least in part via the edge node, wherein the edge attestation process comprises:
  receiving, at the edge node, a second endorsement key from the host node;
  validating the second endorsement key at least by comparing the second endorsement key with the first endorsement key;
  receiving, at the edge node, a second set of state data, wherein the second set of state data is indicative of a state of the host node;
  validating the second set of state data at least by comparing the second set of state data with the first set of state data; and
responsive to validating the second endorsement key and the second set of state data,
  transmitting, from the edge node to the host node, a network address corresponding to a resource of the cloud infrastructure environment,
wherein the host node accesses the resource using the network address.

16. The one or more non-transitory computer-readable media of claim 15, wherein the second endorsement key comprises a public key component of a public attestation identity key.

17. The one or more non-transitory computer-readable media of claim 15, wherein validating the second endorsement key at least by comparing the second endorsement key with the first endorsement key comprises:
  determining that at least one value in the second endorsement key matches a corresponding value in the first endorsement key.

18. The one or more non-transitory computer-readable media of claim 15, wherein validating the second set of state data at least by comparing the second set of state data with the first set of state data comprises:
  identifying a first platform configuration register value included in the first set of state data;
  identifying a second platform configuration register value included in the first set of state data; and
  determining that the first platform configuration register value matches the second platform configuration register value.

19. The one or more non-transitory computer-readable media of claim 15, wherein the operations further comprise:
  mounting a boot partition to a storage module,
    wherein the boot partition is specific to the host node, and wherein the network address corresponds to the boot partition.

20. The one or more non-transitory computer-readable media of claim 15, wherein the second request comprises a request for the network address, wherein the second request is transmitted from the host node responsive to the host node connecting to a datacenter environment comprising one or more computing devices implementing the cloud infrastructure environment.

21. The one or more non-transitory computer-readable media of claim 16,
  wherein the first endorsement key comprises a key generated by a trusted platform module.

22. The one or more non-transitory computer-readable media of claim 21,
  wherein the first endorsement key identifies the host node.

23. The one or more non-transitory computer-readable media of claim 15, wherein the operations further comprise:
  prior to receiving the second request from the host node:
  receiving a pre-boot request from the host node,
    wherein the pre-boot request is for the edge node to transmit a first pre-boot execution environment client to the host node; and
  transmitting the first pre-boot execution environment client to the host node,
    wherein the host node executes a boot procedure using the first pre-boot execution environment client.

24. The one or more non-transitory computer-readable media of claim 23, wherein the second set of state data comprises one or more hashed register values indicative of a state of the host node resulting from executing at least a portion of the boot procedure.

25. The one or more non-transitory computer-readable media of claim 23, wherein the second set of state data comprises a platform configuration register value, wherein the platform configuration register value comprises a plurality of hashed register values, wherein each hashed register value, of the plurality of hashed register values, is indicative of a particular state of the host node during the boot procedure.

26. The one or more non-transitory computer-readable media of claim 25, wherein each hashed register value, of the plurality of hashed register values, is indicative of a particular component or a particular service initiated by the host node.

27. The one or more non-transitory computer-readable media of claim 23, wherein the operations further comprise:
  subsequent to transmitting the first pre-boot execution environment client to the host node:
    executing a second pre-boot execution environment;
    transmitting information associated with the second pre-boot execution environment to the host node while the host node executes the boot procedure using the first pre-boot execution environment client,
      wherein the information associated with the second pre-boot execution environment comprises operating system information corresponding to an operating system executing in association with the second pre-boot execution environment.

28. The one or more non-transitory computer-readable media of claim 27, wherein the operating system is installed on a computing device of the cloud infrastructure environment.

29. The one or more non-transitory computer-readable media of claim 27, wherein the edge node is a component of a smart network interface controller, and wherein the operating system is installed on the smart network interface controller.

30. The one or more non-transitory computer-readable media of claim 27, wherein the information associated with the second pre-boot execution environment allows the host node to execute the boot procedure without the operating system being installed on the host node.

31. The one or more non-transitory computer-readable media of claim 23, wherein the host node generates at least a portion of the second set of state data during the boot procedure.

32. The one or more non-transitory computer-readable media of claim 15, wherein the edge attestation process further comprises:

transmitting a third request from the edge node to the host node,
  wherein the third request is for the edge node to provide the second endorsement key,
wherein the host node receives the third request, and responsive to receiving the third request, the host node generates the second endorsement key and transmits the second endorsement key to the edge node.

33. The one or more non-transitory computer-readable media of claim 32,
  wherein the host node generates a key pair, and
  wherein the second endorsement key is generated by the host node based on the key pair.

34. The one or more non-transitory computer-readable media of claim 33, wherein the key pair comprises a public attestation identity key.

35. The one or more non-transitory computer-readable media of claim 15, wherein the edge attestation process further comprises:
  transmitting a third request from the edge node to the host node,
    wherein the third request is for the edge node to provide the second set of state data,
  wherein the host node receives the third request, and responsive to receiving the third request, the host node generates the second set of state data and transmits the second set of state data to the edge node.

36. The one or more non-transitory computer-readable media of claim 35, wherein the third request is transmitted from the edge node to the host node responsive to validating the second endorsement key.

* * * * *